United States Patent [19]

Prizzi

[11] Patent Number: 4,671,826
[45] Date of Patent: Jun. 9, 1987

[54] METHOD OF PROCESSING TUBING

[75] Inventor: John J. Prizzi, Duquesne, Pa.

[73] Assignee: Westinghouse Electric Corp., Pittsburgh, Pa.

[21] Appl. No.: 762,092

[22] Filed: Aug. 2, 1985

[51] Int. Cl.$^4$ .............................................. C22F 1/18
[52] U.S. Cl. ................................ 148/11.5 F; 148/133
[58] Field of Search ........................... 148/11.5 F, 133

[56] References Cited

U.S. PATENT DOCUMENTS

| | | | |
|---|---|---|---|
| 3,486,219 | 12/1969 | Davies | 148/11.5 F |
| 3,487,675 | 1/1970 | Edstrom et al. | 72/370 |
| 3,865,635 | 2/1975 | Hofvenstam et al. | 148/11.5 F |
| 4,090,386 | 5/1978 | Naylor et al. | 72/208 |
| 4,233,834 | 11/1980 | Matinlassi | 72/208 |
| 4,238,251 | 12/1980 | Williams et al. | 148/133 |
| 4,279,667 | 7/1981 | Anthony | 148/32 |
| 4,294,631 | 10/1981 | Anthony et al. | 148/331 |
| 4,360,389 | 11/1982 | Urquhart | 148/11.5 F |
| 4,372,817 | 2/1983 | Armijo et al. | 376/417 |
| 4,390,497 | 6/1983 | Rosenbaum et al. | 376/414 |
| 4,450,016 | 5/1984 | Vesterlund et al. | 148/11.5 F |
| 4,450,020 | 5/1984 | Vesterlund | 148/11.5 F |
| 4,521,259 | 6/1985 | Eucken | 148/20.3 |

FOREIGN PATENT DOCUMENTS

| | | |
|---|---|---|
| 0085553A2 | 8/1983 | European Pat. Off. |
| 2607141 | 9/1976 | Fed. Rep. of Germany |
| 2509510 | 1/1983 | France |
| 50133 | 3/1985 | Japan ................................. 148/133 |
| 1537930 | 1/1979 | United Kingdom |
| 2086945 | 5/1982 | United Kingdom |
| 2118573 | 11/1983 | United Kingdom |

OTHER PUBLICATIONS

Steinberg et al. "Analytical Approaches and Experimental Verification to Describe the Influence of Cold Work and Heat Treatment on the Mechanical Properties of Zircaloy Cladding Tubes", ASTM STP 824 (1984), pp. 106-122.

Garzarolli et al., "Influence of Final Annealing on Mechanical Properties of Zircaloy Before and After Irradiation" Transaction of the 6th International Conference on Structural Mechanics in Reactory Technology, North-Holland Publishing, (1981).

Hunt et al., "Recrystallization of Zircaloy-4 During Transient Heating," Journal of Nuclear Materials 92 (1980), p. 184.

Kass, "The Development of the Zircaloys," ASTM STP 368 (1964), pp. 3-27.

ASTM B350-80.

WAPD-TM-869 dated 11/79.

WAPD-TM-1289 dated 1/81.

Rose et al., "Quality Costs of Zircaloy Cladding Tubes," Nuclear Fuel Performance, British Nuclear Energy Society (1973), pp. 78.1-78.4.

Anderson et al., "Beta Quenching of Zircaloy Cladding Tubes in Intermediate or Final Size, "ASTM STP 754 (1982), pp. 75-95.

Primary Examiner—Christopher W. Brody
Attorney, Agent, or Firm—D. M. Satina

[57] ABSTRACT

A zirconium alloy fuel cladding tube is provided, having a uniform composition throughout and an outer annular microstructural layer in a cold worked and stress relieved condition over an inner annular microstructural layer in an essentially fully recrystallized condition.

Also described is a method of producing this tubing. This method utilizes an intermediate annealing step in which cold worked tubing is nonuniformly annealed to produce an outer annular layer of essentially fully recrystallized material over an inner layer of cold worked and stress relieved material. Subsequently the nonuniformly annealed material is cold worked and then uniformly annealed to produce the fuel cladding tube described above.

4 Claims, 2 Drawing Figures

METHOD OF PROCESSING TUBING

BACKGROUND OF THE INVENTION

The present invention relates to processes for the manufacture of metallic tubing. It is especially concerned with the processing of zirconium alloy nuclear fuel cladding and the cladding produced thereby.

Zircaloy-2 and Zircaloy-4 are commercial alloys, whosw main usage is in water reactors such as boiling water (BWR), pressurized water (PWR) and heavy water (HWR) nuclear reactors. These alloys were selected based on their nuclear properties, mechanical properties and high temperatures aqueous corrosion resistance.

The history of the development of Zircaloy-2 and 4 is summarized in: Stanley, Kass "The Development of the Zircaloys" published in ASTM Special Technical Publication No. 368 (1964) pp. 3-27, and Rickover et al. "History of of the Development of Zirconium Alloys for use in Nuclear Reactors", NR:D:1975. Also of interest with respect to Zircaloy development are U.S. Pat. Nos. 2,772,964; 3,097,094 and 3,148,055.

The commercial reactor grade Zircaloy-2 alloy is an alloy of zirconium comprising about 1.2 to 1.7 weight percent tin, about 0.07 to 0.20 weight percent iron, about 0.05 to 0.15 weight percent chromium and about 0.03 to 0.08 weight percent nickel. The commercial reactor grade Zircaloy-4 alloy is an alloy of zirconium comprising 1.2 to 1.7 weight percent tin, about 0.18 to 0.24 weight percent iron, and about 0.07 to 0.13 weight percent chromium. Most reactor grade chemistry specifications for Zircaloy-2 and 4 conform essentially with the requirements published in ASTM B350-80 (for alloy UNS No. R60802 and R60804, respectively). In addition to these requirements the oxygen content for these alloys is typically required to be between 900 and 1600 ppm, but more typically is about 1200 ±200 ppm for fuel cladding applications. Variations of these alloys are also sometimes used. These variations include a low oxygen content alloy where high ductility is needed (e.g. thin strip for grid applications). Zircaloy-2 and 4 alloys having small but finite additions of silicon and or carbon are also commercially utilized.

It has been a common practice to manufacture Zircaloy (i.e. Zircaloy-2 and 4) cladding tubes by a fabrication process involving: hot working an ingot to an intermediate size billet or log; beta solution treating the billet; machining a hollow billet; high temperature alpha extruding the hollow billet to a hollow cylindrical extrusion; and the reducing the extrusion to substantially final size cladding through a number of cold pilger reduction passes (typically 2 to 5 with about 50 to about 85% reduction per pass), an alpha recrystallization anneal prior to each pass. The cold worked, substantially final size cladding is then final alpha annealed. This final anneal may be a stress relief anneal, partial recrystallization anneal or full recrystallization anneal. The type of final anneal provided is selected based on the designer's specification for the mechanical properties of the fuel cladding. Examples of these processes are described in detail in WAPD-TM-869 dated 11/79 and WAPD-TM-1289 dated 1/81. Some of the characteristics of conventionally fabricated Zircaloy fuel cladding tubes are described in Rose et al. "Quality Costs of Zircaloy Cladding Tubes" (Nuclear Fuel Performance published by the British Nuclear Energy Society (1973), pp. 78.1-78.4).

In the foregoing conventional methods of tubing fabrication the alpha recrystallization anneals performed between cold pilger passes and the final alpha anneal have been typically performed in large vacuum furnaces in which a large lot of intermediate or final size tubing could be annealed together. Typically the temperatures employed for these batch vacuum anneals of cold pilgered Zircaloy tubing have been as follows about 450 to about 500° for stress relief annealing without significant recrystallization; about 500° C. to about 530° C. for partial recrystallization; annealing; and about 530° C. to about 760° C. (however, on occasion alpha, full recrystallization anneals as high as about 790° C. have been performed) for full alpha reorystallization annealing. These temperatures may vary somewhat with the degree of cold work and the exact composition of the Zircaloy being treated. During the foregoing batch vacuum alpha anneals it is typically desired that the entire furnace load be at the selected temperatures for about one to about 4 hours, or more, after which the annealed tubes are vacuum or argon cooled.

Additional examples of the conventional Zircaloy tubing fabrication techniques, as well as variations thereon, are described in the following documents: "Properties of Zircaloy-4 Tubing" WAPD-TM-585; Edstrom et al. U.S. Pat. No. 3,487,675; Mantinlassi U.S. Pat. No. 4,233,834; Naylor U.S. Pat. No. 4,090,386; Hofvenstam et al U.S. Pat. No. 3,865,635; Anoersson et al. "Beta Quenching of Zircaloy Cladding Tubes in Intermediate or Final Size," *Zirconium in the Nuclear Industry: Fifth Conference.* ASTM STP754 (1982) pp. 75-95.; McDonald et al. U.S. patent application Ser. No. 571,122 a continuation of Ser. No. 343,787, filed Jan. 29, 1982 now abandoned and assigned to the Westinghouse Electric Corporation); Sabol et al. U.S. patent application Ser. No. 571,123 (a continuation of Ser. No. 343,788, filed Jan. 29, 1982, now abandoned and assigned to the Westinghouse Electric Corporation; Armijo et al. U.S. Pat. No. 4,372,817; Rosenbaum et al. U.S. Pat. No. 4,390,497; Vesterlund et al U.S. Pat. No. 4,450,016; Vesterlund U.S. Pat. No. 4,450,020; and Vesterlund French patent application Publication No. 2,509,510 published Jan. 14, 1983.

Included among the foregoing processes and resulting fuel cladding designs are those which include the use of an annular liner of a first material for improved PCI resistance (Pellet Cladding Interaction) bonded to an outer relatively stronger annular layer of a second material which provides the cladding with its aqueous corrosion resistance and required mechanical properties.

There exists a need in the art for a nuclear fuel cladding, and a process for producing that cladding, in which the cladding is made of a single alloy having a combination of the required PCI resistance aqueous corrosion resistance and mechanical properties.

SUMMARY OF THE INVENTION

In the present invention an elongated nuclear fuel cladding tube is provided which has the combination of properties required by the art. The fuel cladding in accordance with the present invention is composed of a single zirconium base alloy. As viewed in transverse cross section, the fuel cladding has an outer annular microstructural layer which is beneath the outer surface of the tube and is characterized by an essentially only cold worked and stress relieved condition. Adjacent the inner surface of the tube and beneath the outer annular layer is another annular microstructural layer in at least a substantially fully recrystallized condition. Preferably this second layer is in a fully recrystallized condition.

The foregoing fuel cladding is preferably achieved by the following process in accordance with the present invention. A starting tube composed of a single material is cold worked, to produce an as cold worked intermediate tube. This as cold worked tube in then intermediate annealed to produce an annular outer layer adjacent the outer surface characterized by an at least substantially fully recrystallized microstructure, under which is produced an inner annular layer adjacent the inside surface of the tube, characterized by a substantially only cold worked and stress relieved microstructure. The intermediate annealed tube is then cold worked again, after which it receives a final anneal. The final anneal produces an outer annular layer which is substantially only stress relieved annealed while producing an inner annular layer which is at least substantially fully recrystallized.

Preferably each cold working step in the foregoing process is a cold pilgering step.

It is also preferred that the intermediate and final annealing steps be performed by scanning the length of the tube with an energized induction coil.

Preferably the alloys used in the nuclear fuel cladding according to the present invention is selected from one of the alloys shown in Table I. Preferably the oxygen content of the alloys is less than 600 ppm and more preferabl less than 400 ppm.

TABLE I

| ALLOY NO. | ALLOYS (weight percent)* | | | | |
|---|---|---|---|---|---|
| | 1 | 2 | 3 | 4 | 5 |
| ELEMENT | | | | | |
| Sn | 1.2-1.7 | 1.2-1.7 | .1-.6 | .1-.6 | .19-.6 |
| Fe | .07-.20 | .18-.24 | .18-.24 | .04-.2 | .19-.5 |
| Cr | .05-0.15 | .07-.13 | .07-.13 | .05-.15 | <.02 |
| Ni | .03-.08 | <.007 | <.007 | .03-.05 | <.007 |
| O (ppm) | 1200 max | 1200 max | 1200 max | 1200 max | 1200 max |

*Balance of alloys essentially Zirconium and incidental impurities.

The foregoing and other aspects of the present invention will become more apparent upon review of the figures, described briefly below, in conjunction with the following detailed description of the invention.

DETAILED DESCRIPTION OF THE INVENTION

Figure 1:
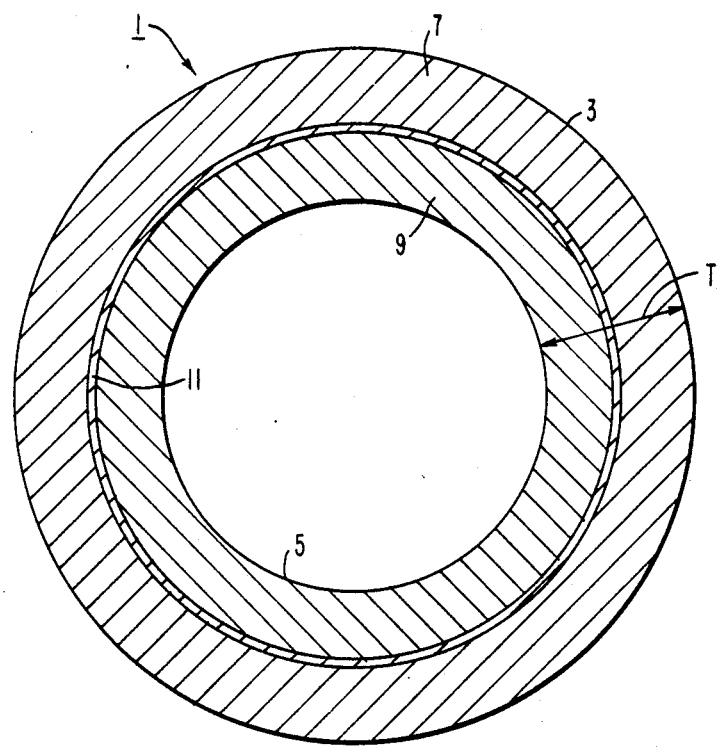
FIG. 1 schematically shows a transverse cross section through an embodiment of a nuclear fuel cladding tube in accordance with the present invention.

In accordance with a preferred embodiment of the present invention a transverse cross section through an elongate nuclear fuel cladding tube 1 is schematically shown in FIG. 1. The cladding tube is composed of a zirconium based alloy, preferably selected from the group of alloys shown in Table I. The tube is preferably composed of a single alloy from a single ingot. The composition of the tube 1 is therefore essentially uniform from its outside diameter (OD) surface 3 through its wall thickness to its inside diameter (ID) surface 5.

The tube 1 has been fabricated in accordance with the present invention to provide the final tube with two main annular microstructural layers. The outer annular layer 7 is preferably in an essentially only cold worked and stress relieved condition containing no more than 20% by area recrystallized grains, and preferably less than 15% by area recrystallized grains, and is adjacent to the tube OD surface 3. Beneath the outer annular layer 7 and adjacent to the tube ID surface 5 is an inner annular layer 9 in a substantially fully recrystallized microstructural condition containing at least 80% by area recrystallized grains, and preferably at least 85% by area recrystallized grains. Between the inner layer 9 and the outer layer 7 may be transition layer 11 which displays a partially recrystallized microstructural condition.

The outer layer 7 preferably has a thickness between about 40 to about 60% of the overall tube wall thickness, T. More preferably the thickness of the outer layer is between about 50 to 60% of the wall thickness, T. The inner layer 9 preferably has a thickness between about 60 to 15 % and more preferably 40 to 20% of the wall tnickness, T. The transition layer 11 is preferably less than 25% of the wall thickness, T, and more preferably less than 10% of the wall thickness, T.

The zirconium alloy composing this fuel cladding tube may be selected from those alloys known, by those of ordinary skill in the art, to have the aqueous corrosion resistance and the structural properties in cold worked and stress relieved condition, which are required for the particular water reactor application in question. Preferably the alloy may be selected from one of those shown in Table I. Where maximum PCI resistance is required it is preferred that the oxygen content of the alloy be held below about 600 ppm, and more preferably below 400 ppm.

It is submitted that the fuel cladding tube 1 will exhibit a combination of the required PCI resistance, while having the aqueous corrosion and structural properties required for water reactor applications, without the need to separately produce two tubular materials of differing composition, which are subsequently bonded together, one inside the other.

The fuel cladding tube 1 in accordance with the present invention is preferably made by the following fabrication process in accordance with the present invention.

Figure 2:
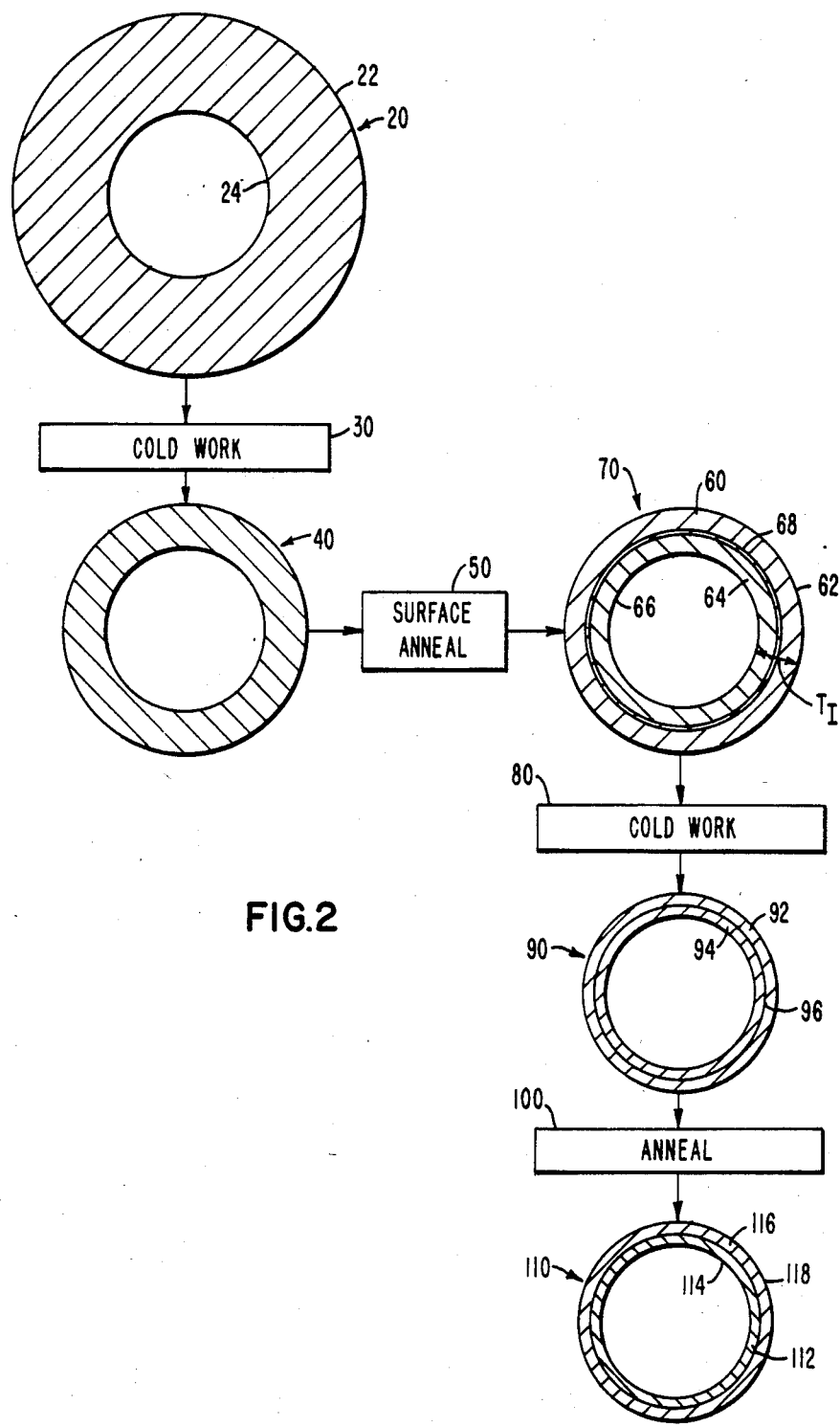
FIG. 2 is a flow diagram of an embodiment of the tube fabrication process in accordance with the present invention.

A schematic flow diagram of the process in accordance with the present invention is shown in FIG. 2. Preferably the starting tube 20 is made of a single zirconium base alloy as previously described. The starting tube 20 may have a beta quenched microstructure throughout its wall thickness, or may have a fully recrystallized microstructure throughout. In a preferred embodiment the starting tube 20 has an outer annular beta quenched microstructural layer adjacent its OD surface 22 and an inner fully recrystallized layer adjacent its ID surface 24. Most preferably the starting tube 20 has previously received at least one prior cold pilgering pass.

The starting tube 20 receives a cold working step 30, which is preferably a single cold pilger pass in which the cross sectional area of the starting tube 20 is reduced between about 50 to 85% and more preferably 70% to 80%.

The sulting intermediate size, as cold worked tube 40 then receives a surface anneal 50. In surface anneal 50 the tube 40 is rapidly scanned with a rapid heating means, such as a laser, or energized induction coil to produce full recrystallization (i.e. at least 95% by area recrystallized grains) only in an outer annular layer 60 adjacent OD surface 62, while the inner annular layer 64, which is adjacent the ID surface 66, is only in a cold worked and stress relieved condition (i.e. less than 5% by area recrystallized grains). Separating the two layers 60 and 64 there may be a relatively narrow partially recrystallized layer 68. Preferably the thicknesses of these layers are as follows: inner layer 64—about 60 to 15%, and more preferably about 40 to 20% of the overall wall thickness $T_I$; intermediate layer 60—less than about 25%, and more preferably less than about 10% of wall thickness $T_I$; and outer layer 60—about 40 to 60%, and more preferably 50 to 60% of wall thickness $T_I$.

The surface annealed tube 70 is then cold worked in step 80 to a final as cold worked tube 90. In step 80 the cross sectional area of the tube 70 is reduced between about 15 and 75%. Preferably step 80 is a single cold pilgering or cold drawing step providing a reduction in cross sectional area of less than about 60%. The resulting as cold worked tube 90 has essentially two annular layers 92 and 94 separated by a transition layer 96. The microstructure of the outer layer 92 has a lower degree of cold work (i.e. lower dislocation density) than the inner layer 94 which has accumulated the cold work provided by both cold working steps 30 and 80. The difference in degree of cold work between the outer 92 and inner 94 layers is preferably at least about 30% (e.g. the outer layer 92 having had a 60% reduction, while the inner layer 94 has had a 90% reduction) and more preferably at least about 40%. The inner layer 94 preferably has an overall level of cold work of at least about 80%.

The final as cold worked tube 90 is then final annealed in step 100 preferably via induction annealing as described in copending, concurrently filed U.S. Pat. application Ser. No. 762,094 assigned to the Westinghouse Electric Corporation, the assignee herein). This copending application enables one of ordinary skill in the art to select induction annealing parameters which will result in a final annealed tube 110 having a substantially fully recrystallized inner layer 112 adjacent ID surface 114 and an essentially only cold worked and stress relieved outer layer 116 adjacent OD surface 118. In all respects the final annealed tube 110 is as shown in FIG. 1 and the prior description with respect to FIG. 1.

The final anneal performed in step 100 differs from the surface anneal performed in step 50, in that anneal 100 is selected to provide a substantially uniform heat treatment throughout the wall thickness of the final as cold worked tube 90. It can now readily be seen by those of ordinary skill in the art that the differences in level of cold work found in layer 94 and 92 lead to differences in the recrystallization kinetics of these two layer during final anneal 100. By carefully controlling the final annealing procedure, as is now possible using the induction annealing process described in the aforementioned copending patent application, these differences in annealing kinetics are utilized in the present invention to produce the final fuel cladding tube in accordance with the present invention.

The preceding description and examples have clearly demonstrated the benefits obtainable according to the present invention. Other embodiments of the invention will become more apparent to those skilled in the art from a consideration of the specification or practice of the invention disclosed herein. It is intended that the specification and examples be considered as exemplary only, with the true scope and spirit of the invention being indicated by the following claims. All documents referred to herein are hereby incorporated by reference.

I claim:

1. A process for manufacturing zirconium base alloy tubing having a substanially uniform metallic composition throughout said tubing, comprising the steps of:
    cold pilgering a starting tube to produce an as cold pilgered intermediate tube;
    intermediate surface annealing said as cold pilgered intermediate tube by rapidly scanning the tube with a rapid heating means to heat a first annular outer layer to a higher temperature than a first annular inner layer to produce said fist annular outer layer which is fully recrystallized while producing said first annular inner layer which is only stress relief annealed and located inside of said first annular outer layer;
    after said intermediate annealing, cold pilgering the intermediate annealed tube to produce a second as cold pilgered tube, said second as cold pilgered tube having a second outer layer having a predetermined first degree of said cold work and a second inner layer having a second degree of cold work higher than said first predetermined degree of cold work;
    and then final annealing said second as cold pilgered tube to provide a substantially uniform heat treatment throughout the wall thickness of said second as cold pilgered tube to produce said second outer layer which is essentially only stress relief annealed while producing said second inner layer which is at least substanially fully recrystallized, and located inside of said second outer layer, the difference between the level of recrystallization of said second outer layer and said second inner layer resulting from the combination of the final annealing of said second as cold pilgered tube by a substanially uniform heat treatment throughout the wall thickness and the different degrees of cold work between said second inner layer and said second outer layer with said second inner layer having a higher degree of cold work than said second outer layer.

2. The process according to claim 1 wherein said rapid heating means comprises an energized induction heating coil and said final annealing step is performed by scanning the tube with an energized induction heating coil.

3. The process according to claim 2 wherein said second outer layer extends between about 40 to about 60 percent through the tube wall thickness and the second inner layer extends about 15 to about 60 percent through the tube wall thickness.

4. The process according to claim 3 wherein the second outer layer extends between about 50 to about 60 percent through the tube wall thickness and the second inner layer extends between about 20 to about 40 percent through the tube wall thickness.

* * * * *